(12) United States Patent
Koopmans et al.

(10) Patent No.: US 8,949,368 B2
(45) Date of Patent: Feb. 3, 2015

(54) METHOD FOR CACHE OBJECT AGGREGATION

(75) Inventors: Chris Koopmans, Sunnyvale, CA (US); Kannan Parthasarathy, Palo Alto, CA (US); Nicholas Stavrokos, Mountain View, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1482 days.

(21) Appl. No.: 11/432,951

(22) Filed: May 12, 2006

(65) Prior Publication Data

US 2007/0266113 A1    Nov. 15, 2007

(51) Int. Cl.
*G06F 15/16* (2006.01)
*G06F 17/30* (2006.01)
*H04L 29/06* (2006.01)

(52) U.S. Cl.
CPC ...... *G06F 17/30902* (2013.01); *G06F 17/3048* (2013.01); *H04L 69/22* (2013.01)
USPC ......................................................... 709/217

(58) Field of Classification Search
CPC ............ H04L 67/2842; H04L 67/1097; H04L 29/087292; H04L 29/08801; H04L 29/08864; H04L 67/288; H04L 67/2885

USPC .......................................................... 709/217
See application file for complete search history.

(56) References Cited

U.S. PATENT DOCUMENTS

| | | | | |
|---|---|---|---|---|
| 6,289,358 | B1* | 9/2001 | Mattis et al. | 707/695 |
| 6,785,769 | B1* | 8/2004 | Jacobs et al. | 711/118 |
| 6,789,170 | B1* | 9/2004 | Jacobs et al. | 711/133 |
| 7,043,558 | B2* | 5/2006 | Yoshida et al. | 709/231 |
| 7,343,398 | B1* | 3/2008 | Lownsbrough | 709/218 |

OTHER PUBLICATIONS

Fielding, R. et al., "RFC2616," http://rfc.net/rfc2616.html, The Internet Society (1999) pp. 1-165.

* cited by examiner

*Primary Examiner* — Andrew Georgandellis
(74) *Attorney, Agent, or Firm* — Finnegan, Henderson, Farabow, Garrett & Dunner LLP

(57) ABSTRACT

A system including a first user agent configured to transmit request data corresponding to a requested web page, wherein the request data includes a request data header, and an optimization server configured to receive the request data, to determine whether the request header data matches a classification of a grouping that identifies cached content data, wherein the grouping is configured based on similarities between a first content data and a second content data; and to transmit the cached content data to the user based on the determination.

15 Claims, 7 Drawing Sheets

METHOD FOR CACHE OBJECT AGGREGATION

BACKGROUND INFORMATION

Caching has always been an important part of the HTTP protocol, which specifies the behavior of clients, servers, and proxy caches. The content server receives an HTTP request for a URL that includes an HTTP request header. The following are two exemplary request headers:

GET/HTTP/1.1
Host: www.somewhere.com
X-MSISDN: 0124356789
User-Agent: Mozilla/4.0 (compatible; MSIE 6.0; Windows NT 5.1; QFE 123456) and
GET/ HTTP/1.1
Host: www.somewhere.com
X-MSISDN: 9876543210
User-Agent: Mozilla/4.0 (compatible; MSIE 6.0; Windows NT 5.1).

Once the content server receives the request, the content server can determine whether to cache the content data related to the requested URL at the user agent or an intermediary cache. If the content server determines not to cache the content data, the content server appends the appropriate response data header to the response data transmitted to the appropriate device, such as the user agent.

If the content server determines that the content data is to be cached, the content server would append the appropriate response data header to the response data and transmit the response data to the cache to be stored for a configurable amount of time. But this created a significant problem at the intermediate cache because the content server can provide two users who request the same URL with the wrong content data. For example, the two exemplary requests provided above could result in different content data. If an intermediate cache was not aware of the difference, cached content data from the first request header data could be transmitted to the second user agent requesting the same URL with a second header data. Because of the differences between the content data, the second user agent could receive faulty content data so that the second user agent would not provide the correct data to the user. In other words, the cache could not distinguish between this content data. To address this problem, a "Vary" response header was created to allow the content server to notify the cache of response headers that could directly affect the content data. For example, the exemplary request headers, shown above, inform the content server the browser name, version, etc. that is requesting the content. A rich browser (one that supports many internet standards) may get response data that is full of rich content, while a limited browser (one that supports few internet standards) may get a much simpler response.

Unfortunately, while the request header data is important, the "Vary" response header method does not inform the intermediary caches how the values in the "Vary" header are used. For example, using the same two exemplary request headers:

GET/HTTP/1.1
Host: www.somewhere.com
X-MSISDN: 0124356789
User-Agent: Mozilla/4.0 (compatible; MSIE 6.0; Windows NT 5.1; QFE 123456) and
GET/HTTP/1.1
Host: www.somewhere.com
X-MSISDN: 9876543210
User-Agent: Mozilla/4.0 (compatible; MSIE 6.0; Windows NT 5.1), that can have the same response header data (as provided below), but with different content data (even if the content data is substantially similar):

HTTP/1.1 200 OK
Vary: User-Agent, X-MSISDN
Content Length: 1000
Expires: Thu, 1 Dec. 1994 16:00:00 GMT.

The "Vary" response header instructs the intermediary cache that the content data for this response is cacheable, but may be different for requests with different values within the request headers data of "X-MSISDN" and "User-Agent". For an HTTP compliant intermediary cache, if the user agent downloads the URL http://www.somewhere.com/ and the intermediate cache caches the response, then a second request with different values for the HTTP request headers "X-MSISDN" and "User-Agent" cannot re-use the cached content data even if the content data corresponding to the second request is the same or substantially similar to cached content data. Because this second request was not matched to the cached content data, the response data corresponding to the second request is stored in the intermediary cache as well. Consequently, the cache could have hundreds or thousands of entries for content data that are the same or substantially similar. This results in inefficient use of the intermediary cache.

DESCRIPTION OF THE EMBODIMENTS

Reference will now be made in detail to the exemplary embodiments implemented according to the invention, the examples of which are illustrated in the accompanying drawings. Wherever possible, the same reference numbers will be used throughout the drawings to refer to the same or like parts.

Figure 1:
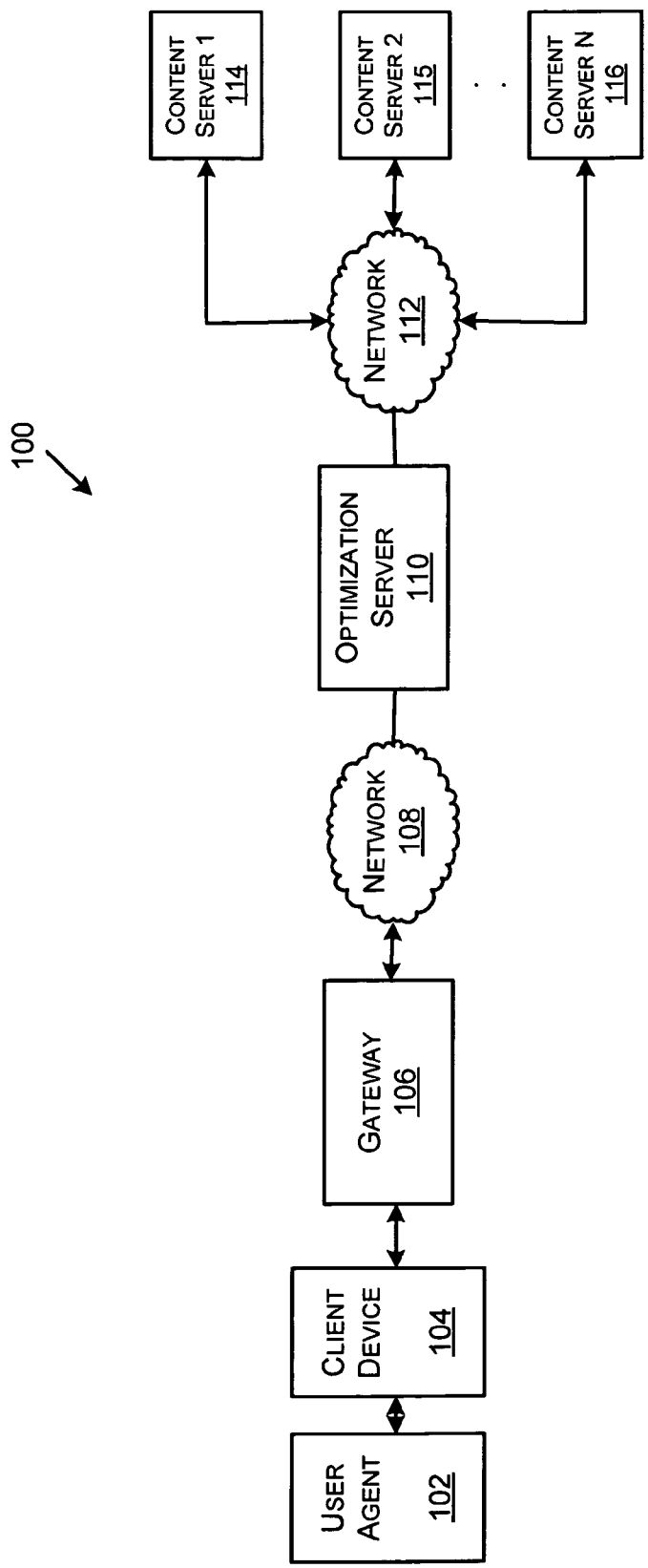
FIG. 1 is a block diagram of an exemplary system.

FIG. 1 is a block diagram of an exemplary system. Exemplary system 100 can be any type of system that transmits data over a network. For example, the exemplary system can include a browser accessing information from content servers through the Internet. The exemplary system can include, among other things, a user agent 102, a client device 104, a gateway 106, one or more networks 108, 112, an optimization server 1-10, and one or more content servers 114-116.

User agent 102 is a client application used with a network protocol. For example, user agent 102 could be a web browser, a search engine crawler, a screen reader, or a Braille browser, and user agent 102 could be used to access the Internet. User agent 102 can be a software program that transmits request data (e.g., an HTTP/HTTPS/WAP/WAIS/Gopher/RTSP request, etc.) to a web server and receives response data in response to the request data. For example, user agent 102 can send a request to content servers 114-116 for a particular file or object data of a web page by its URL/URI, and the content server of the web page can query a database for content data that the content server includes as part of the response data (e.g., HTTP/WAP response data) transmitted to the user agent. This process continues until every object in the web page has been downloaded to the user agent.

Client device 104 is a computer program or hardware device that can access remote services. Client device 104 can receive request data from user agent 102, can transmit the request data to the content servers, and can receive response data in response to the request data. For example, client device 104 can be Bytemobile Optimization Client Software. In some embodiments, user agent 102 and client device 104 can be housed in the same device, such as a computer, a PDA, a cell phone, a laptop, or any device accessing the Internet. In some embodiments, client device 104 can be removed and its functionality can be included in user agent 102.

Gateway 106 is a device that converts formatted data provided in one type of network to a particular format required for another type of network. Gateway 106, for example, may be a server, a router, a firewall server, a host, or a proxy server. Gateway 106 has the ability to transform the signals received from user agent 102 or client device 104 into a signal that network 108 can understand and vice versa.

Networks 108 and 112 can include any combination of wide area networks (WANs), local area networks (LANs), or wireless networks suitable for networking communication such as Internet communication.

Optimization server (OS) 110 is a server that provides communications between gateway 106 and content servers 114-116. For example, OS 110 could be a Bytemobile Optimization Services Node. OS 110 can optimize performance by enabling significantly faster and more reliable services to customers. OS 110 can include optimization techniques, which are further described below.

Content servers 114-116 are servers that receive the request data from user agent 102, process the request data accordingly, and return the response data back to user agent 102. For example, content servers 114-116 can be a web server, an enterprise server, or any other type of server. Content servers 114-116 can be a computer or a computer program that is responsible for accepting HTTP requests from the user agent and serving the user agents with web pages.

Figure 2:
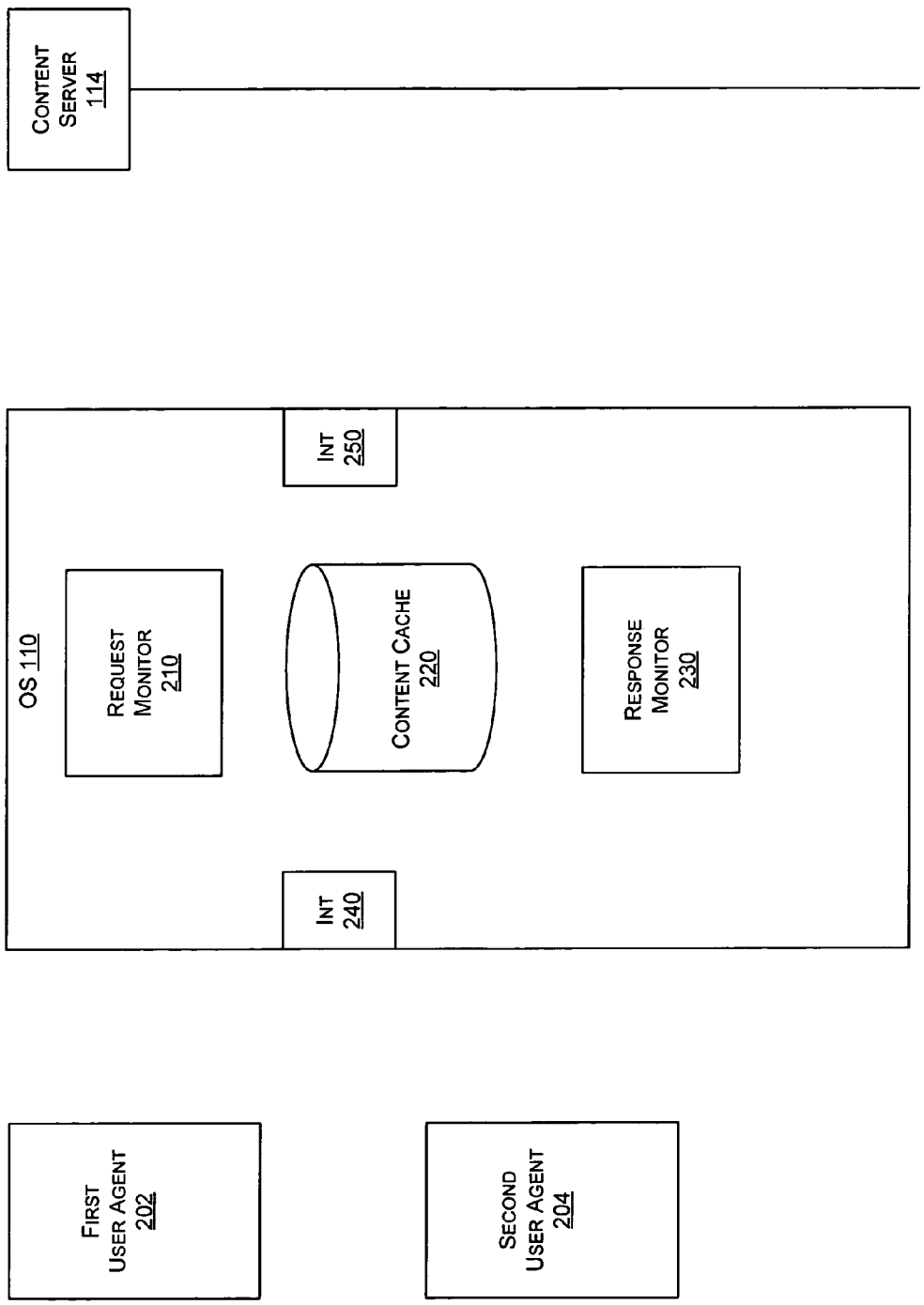
FIG. 2 is a block diagram illustrating an embodiment of the exemplary system of FIG. 1.

FIG. 2 is a block diagram illustrating an embodiment of the exemplary system of FIG. 1. First and second user agents 202, 204 are similar to user agent 102. OS 110 may include, among other things, a request monitor 210, a content cache 220, a response monitor 230, and interfaces 240, 250.

Request monitor 210 can be a software program, hardware device, or a combination of both that receives or intercepts the request data, such as an HTTP request for a specific URL, from a user agent. Request monitor 210 can communicate with the content cache 220 to determine whether the content cache 220 includes cached content data that relates to the request data received from a user agent. In some embodiments, request monitor 210 can use the request header data of the request data to determine if the cached content data relates to the request data. If the cached content data relates to the request data, request monitor 210 can forward the content data to the user agent. Request monitor 210 also has the ability to transmit the request data to content server 114 if the cached content data does not relate to the request data.

Content cache 220 can be a software program, hardware device, or a combination of both that stores response data received from content server for future referencing. Content cache 220 can store the response data based on the requested URL and configurable groupings. These groupings allow content cache 220 to store a minimal amount of data at the data cache by distinguishing between multiple responses based on the content data and the response data header. To qualify for a grouping, the content data of the request data should be substantially similar to the content data in the content cache 220, wherein substantially similar could be exactly the same or similar enough such that they can be displayed by the user agent without a visible difference, or could be based on what an administrator determines to be substantially similar content data. Further, these groupings can be identified by grouping classifications, which, for example, can include the URL of the content data, the acceptable user agent(s), etc. For example, an administrator can classify the groupings based on the URL requested and the user agent requesting the URL, such as Internet Explorer or a user agent on a Nokia™ phone because the content data could be considered not being substantially similar (i.e., substantially different) based on the configurations of the user agent. Even though both user agents are requesting the same URL, the content data could be considered substantially different based on the configurations, the versions, and the features of the user agent, the geographic region that the request was made from, the ISP that the request is made from, etc. For example, the following two requests, GET/HTTP/1.1
Host: www.somewhere.com
X-MSISDN: 0124356789
User-Agent: Mozilla/4.0 (compatible; MSIE 6.0; Windows NT 5.1; QFE 123456) and
GET/HTTP/1.1
Host: www.somewhere.com
X-MSISDN: 9876543210
User-Agent: Mozilla/4.0 (compatible; MSIE 6.0; Windows NT 5.1), could result in substantially similar, but still different content data being provided in a response. A grouping that mapped these two requests could be created to optimize the efficiency of content cache 220 so that subsequent requests could be mapped to this grouping. Any sort of grouping can be configured at the content cache 220, such as groupings based on the user agent, the type of device the user agent is located at, the content data, etc. In some embodiments, the content cache 220 can configure the data automatically based on a comparison, which is further described below.

Response monitor 230 can be a software program, hardware device, or a combination of both that receives response data from the content server 114. After receiving the response data, response monitor 230 has the ability to provide the response data to content cache 220 for storage and/or transmit the response data to the user agent. Further, in some embodiments, response monitor 230 can provide the comparison and/or assist content cache 220 with comparing the received content data with the content data stored at content cache 220.

Interfaces 240 and 250 are software programs or hardware devices that communicatively couple OS 110 with user agents 202, 204 and content server 114 through wired or wireless communication means. Each interface has the ability to communicate with the elements of OS 110, translate the communication so that the communication means can utilize the data, and transmit the translated communication across the corresponding communication means. In some embodiments, interfaces 240 and 250 can include encryption means and/or decryption means to encrypt communications leaving from and decrypt communications coming into OS 110.

Figure 3:
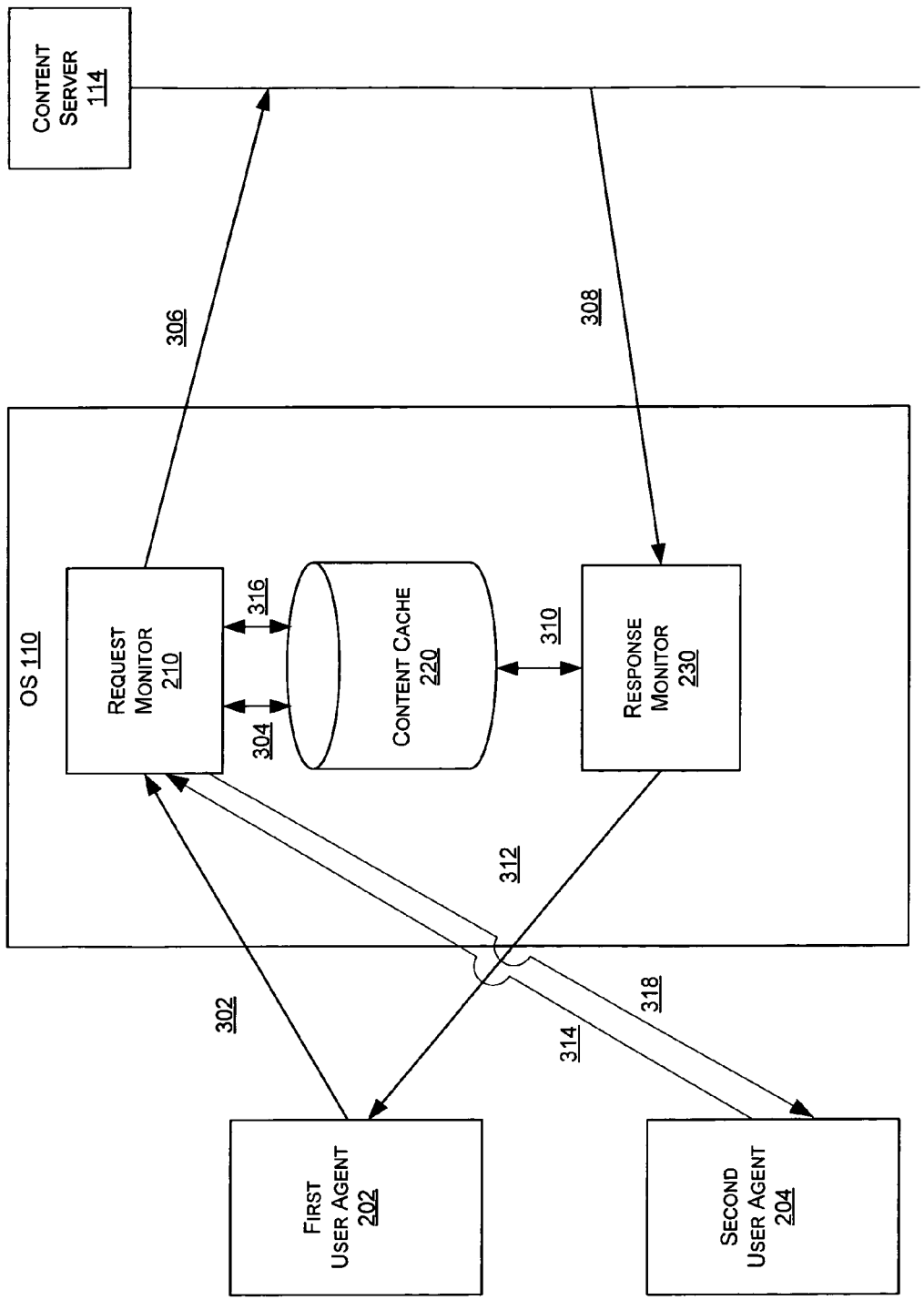
FIG. 3 is a functional diagram illustrating an exemplary communication flow in the exemplary system of FIG. 2.

FIG. 3 is a functional diagram illustrating an exemplary communication flow in the system of FIG. 2. It is assumed for the purposes of explaining this exemplary communication flow that the content data requested by the second user agent 204 is substantially similar to the cached content data requested by the first user agent 202. The user inputs a URL into first user agent 202. First user agent 202 transmits (302) the request data to OS 110. The request data can include request header data that can include, among other things, the requested URL, the X-MSISDN, and the user agent making the request. In some embodiments, not shown in FIG. 3, first user agent 202 transmits the request data to client device 104, wherein client device 104 analyzes and processes it before forwarding the request data to OS 110. The request data can be directed explicitly to a gateway or proxy and then to OS 110, or it can be directed to the content server 114 and the request can be intercepted transparently by an inline proxy or gateway. In some embodiments, the request data is directed to content server 114. Further, in some embodiments, user agent 102 can send the request data over a wireless link.

Request monitor 210 queries (304) content cache 220 for any content data relating to the request data. Request monitor 210 can supply request header data to content cache 220 and the content cache 220 returns cached content data if there is request header data that matches grouping classifications that identify the cached content data. For example, request monitor 210 provides a URL www.somewhere.com to content cache 220 and content cache 220 has the ability to filter through its grouping classifications to determine that there are two groupings that provide content data for www.somewhere.com. In response, request monitor 210 can provide additional request header data, such as user agent header data, to the content cache 220 to further try to match the additional request header data with additional grouping classification. In this particular exemplary embodiment, content cache 220 examines the user agent data included with the two groupings. Based on the preconfigured groupings, content cache 220 does not find a match between a grouping classification that distinguishes the groupings and the user agent request header data. Thus, content cache 220 communicates to request monitor 210 that there was not a match.

After the communications between request monitor 210 and content cache 220, request monitor forwards (306) the request data to content server 114. Consequently, content server 114 provides (308) response data (e.g., HTTP response data) associated with the request data to response monitor 230 of OS 110. The response data can include, among other things, content data relating to the requested URL, a response data header, etc. The response data header may include a "Vary" header data, defined in RFC 2616, identifying data that the content server selects to represent the content data so that this content data can be later considered for subsequent requests. The response header data can also include, among other things, a content length header, a freshness expiration header, etc. Further, in this exemplary embodiment, content server 114 includes information within the response data header that indicates that the content data is cacheable.

After response monitor 230 receives the response data, response monitor 230 can transmit (310) all or portions of the response data to content cache 220 for later referencing. The response data can be organized into a grouping that has been preconfigured to include this response data and subsequent response data that includes similar content data. The groupings can be preconfigured by an administrator based on the similarities between content data. For example, the administrator may determine beforehand that a content server will still provide the same content data for two separate requests having two different X-MSISDN request header data, while the content server will respond with different content data for two separate requests having two different user agent response header data. Because the content data is substantially different, the administrator can configure the content cache 220 to include two different groupings based on the two different user agents and the requested URL. In some instances, the two user agents can be different, but still provide substantially similar content data that can be stored into a single grouping. Each grouping can store a single copy of the content data so that the content cache 220 is not prematurely filled. As long as the content data is deemed substantially similar to other content data, the content data can be stored in the same grouping. When content cache 220 receives subsequent request data that requests cached content data that the administrator has configured to be substantially similar, content cache 220 could return this content data to the request monitor 210 so that the request monitor 210 can transmit the content data to the requesting user agent.

In some embodiments, these groupings can be set up automatically by the content cache 220 or the response monitor 230. For example, once response monitor 230 receives the response data, response monitor 230 can request the content cache for any groupings that correspond to this response data. For example, content cache 220 may provide one grouping that includes content data corresponding to the URL www.somewhere.com and grouping classification that includes the text-string "nokia" being located in the user agent request header data. This grouping classification may be based on requests from Nokia™ phones. Another grouping may include content data corresponding to the URL www.somewhere.com and grouping classification that includes the text-string "motorola" being located in the user agent request header data. This grouping classification may be based on requests from Motorola™ phones. This particular response data may correspond to URL www.somewhere.com, but does not relate to either the "nokia" or "motorola" text string grouping classifications. Response monitor 230 can compare the content data of the response data header with the stored grouping content data. If the content data is a substantially the same, the response monitor can update the grouping classification at the content cache so that similar requests that correspond to this response content data can be provided to request monitor 210 to be uploaded to the requesting user agent. If a match between the response content data and the cached content data does not occur, the content cache can add an additional grouping for this particular response data having substantially different content data and store this content data within content cache 220 for later referencing.

For this exemplary embodiment, after content cache 220 has stored the response data, response monitor 230 can transmit (312) the response data to first user agent 202 for uploading.

At some point after the content cache 220 has stored the response data, second user agent can transmit (314) request data to OS 110. In this exemplary embodiment, the request data includes a request for a URL that is the same to the URL of request data transmitted in step 302. Furthermore, second user agent 204 is substantially similar, as deemed by the configured grouping provided in content cache 220, to first user agent 202.

Request monitor 210 queries (316) content cache 220 for any-content data relating to the request data. Request monitor 210 can provide request header data to content cache 220 and the content cache 220 reviews its groupings to determine if there is a corresponding match between the provided request header data and the grouping classifications. If there is a match, the groupings having the matching grouping classification can provide the cached content data to request monitor 210. In this exemplary embodiment, because content cache 220 was previously provided with content data that is still "fresh" (defined in RFC 1945 and RFC 2616) and is deemed to be substantially similar to content data provided to content cache in step 310, content cache provides the cached content data to request monitor 210. Consequently, request monitor 210 can transmit (318) the content data to second user agent 204 without having to request content server 114 for the content data.

Figure 4:
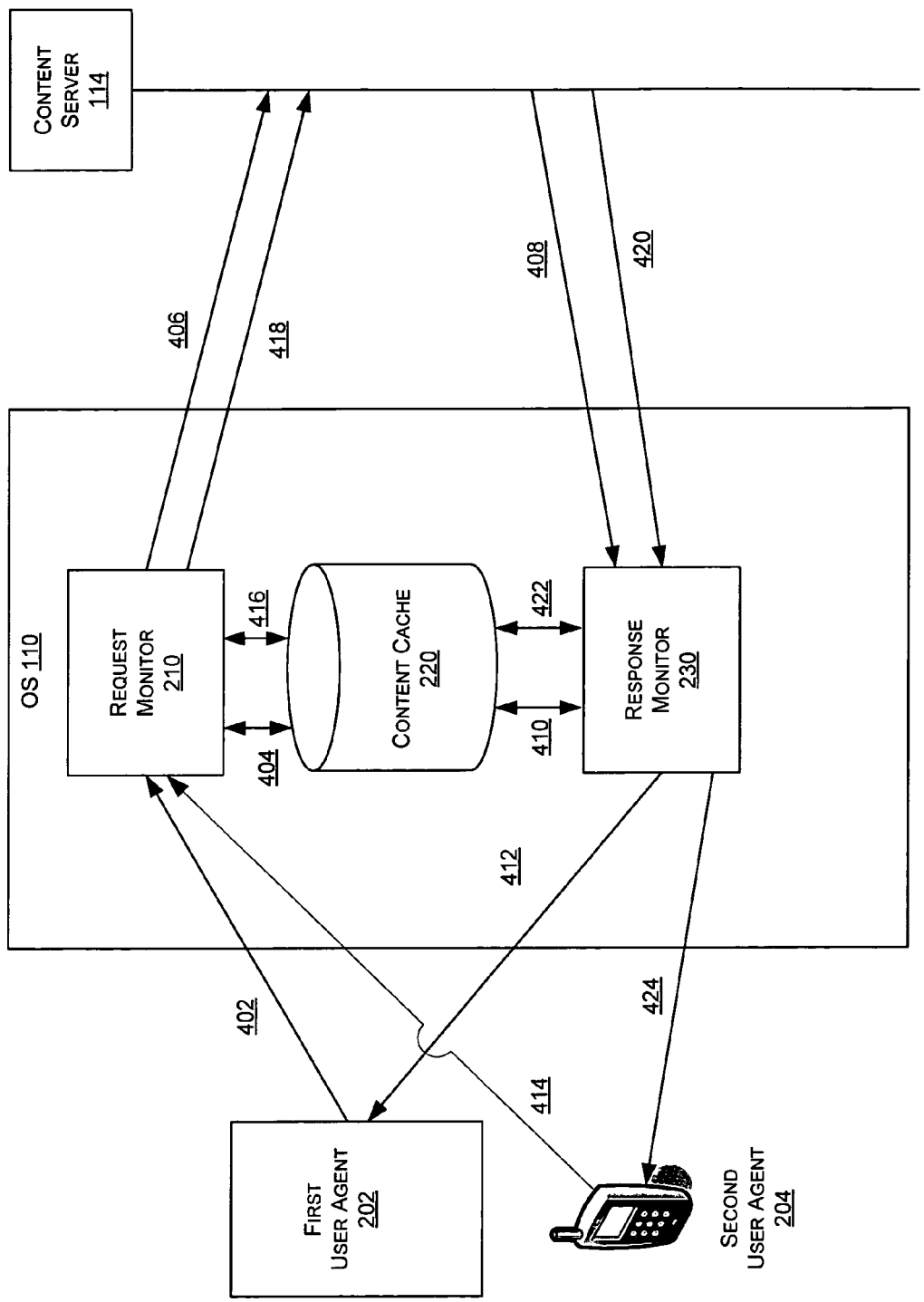
FIG. 4 is a functional diagram illustrating an exemplary communication flow in the exemplary system of FIG. 2.

FIG. 4 is a functional diagram illustrating an exemplary communication flow in the system of FIG. 2. It is assumed for the purposes of explaining this exemplary communication flow that the content data requested by the second user agent 204 is not substantially similar (i.e., substantially different), as deemed by content cache 220, to the content data requested by first user agent 202. The user inputs a URL into first user agent 202. First user agent 202 transmits (402) the request data to OS 110. The request data can include request header data that can include, among other things, the requested URL, the X-MSISDN, and the user agent making the request. In some embodiments, not shown in FIG. 4, first user agent 202 transmits the request data to client device 104, wherein client device 104 analyzes and processes it before forwarding the request data to OS 110. The request data can be directed explicitly to a gateway or proxy and then to OS 110, or it can be directed to the content server 114 and the request can be intercepted transparently by an inline proxy or gateway. In some embodiments, the request data is directed to content server 114. Further, in some embodiments, user agent 102 can send the request data over a wireless link.

Request monitor 210 queries (404) content cache 220 for any content data relating to the request data. Request monitor 210 can supply request header data to content cache 220 and the content cache 220 returns cached content data if there is request header data that matches grouping classifications that identify the cached content data. For example, request monitor 210 provides a URL www.somewhere.com to content cache 220 and content cache 220 has the ability to filter through its grouping classifications to determine that there are two groupings that provide content data for www.somewhere.com. In response, request monitor 210 can provide additional request header data, such as user agent header data, to the content cache 220 to further try to match the additional request header data with additional grouping classification. In this particular exemplary embodiment, content cache 220 examines the user agent data included with the two groupings. Based on the preconfigured groupings, content cache 220 does not find a match between a grouping classification that distinguishes the groupings and the user agent request header data. Thus, content cache 220 communicates to request monitor 210 that there was not a match.

After the communication between request monitor 210 and content cache 220, request monitor forwards (406) the request data to content server 114. Consequently, content server 114 provides (408) response data (e.g., HTTP response data) associated with the request data to response monitor 230 of OS 110. The response data can include, among other things, content data relating to the requested URL, a response data header, etc. The response data header may include a "Vary" header data, defined in RFC 2616, identifying data that the content server selects to represent the content data so that this content data can be later considered for subsequent requests. In addition, the response header data can include, among other things, a content length header, a freshness expiration header, etc. Further, in this exemplary embodiment, content server 114 includes information within the response data header that indicates that the content data is cacheable.

After response monitor 230 receives the response data, response monitor 230 can transmit (410) all or portions of the response data to content cache 220 for later referencing. The response data can be organized into a grouping that has been preconfigured to include this response data and subsequent response data that includes similar content data. The groupings can be preconfigured by an administrator based on the similarities between content data. For example, the administrator may determine beforehand that a content server will still provide the same content data for two separate requests having two different X-MSISDN request header, while the content server will respond with different content data for two separate requests having two different user agent response header data. Because the content data is substantially different, the administrator can configure the content cache 220 to include two different groupings based on the two different user agents and the requested URL. In some instances, the two user agents can be different, but still provide substantially similar content data that can be stored into a single grouping. Each grouping can store a single copy of the content data so that the content cache 220 is not prematurely filled. As long as the content data is deemed substantially similar to other content data, the content data can be stored in the same grouping. When content cache 220 receives subsequent request data that requests cached content data that the administrator has configured to be substantially similar, content cache 220 could return this content data to the request monitor 210 so that the request monitor 210 can transmit the content data to the requesting user agent.

In some embodiments, these groupings can be set up automatically by the content cache 220 or the response monitor 230. For example, once response monitor 230 receives the response data, response monitor 230 can request the content cache for any groupings that correspond to this response data. For example, content cache 220 may provide one grouping that includes content data corresponding to the URL www.somewhere.com and grouping classification that includes the text-string "nokia" being located in the user agent request header data. This grouping classification may be based on requests from Nokia™ phones. Another grouping may include content data corresponding to the URL www.somewhere.com and grouping classification that includes the text-string "motorola" being located in the user agent request header data. This grouping classification may be based on requests from Motorola™ phones. This particular response data may correspond to URL www.somewhere.com, but does not relate to either the "nokia" or "motorola" text string grouping classifications. Response monitor 230 can compare the content data of the response data header with the stored grouping content data. If the content data is substantially similar, the response monitor can update the grouping classification at the content cache so that similar requests that correspond to this response content data can be provided to request monitor 210 to be uploaded to the requesting user agent. If a match between the response content data and the cached content data does not occur, the content cache can add an additional grouping for this particular response data having substantially different content data and store this content data within content cache 220 for later referencing.

In this exemplary embodiment, the content data corresponds to URL www.somewhere.com requested from a laptop using Internet Explorer x.x. The content cache 220 is either preconfigured to or automatically provides a separate grouping for this particular grouping having grouping classification:

URL: www.somewhere.com

User agent: Internet Explorer x.x.

For this exemplary embodiment, after the content cache 220 has stored the response data, response monitor 230 can transmit (412) the response data to first user agent 202 for uploading.

At some point after the content cache 220 has stored the response data, second user agent 204, such as a user agent on a Samsung™ wireless phone, can transmit (414) request data to OS 110. In this exemplary embodiment, the request data includes a request for a URL corresponding to content data that is substantially different from content data provided in response to request data transmitted in step 402. In. some embodiments, for example, the content data is different because second user agent 204 requests content data that is substantially different, as deemed by the configured grouping provided in content cache 220, from content data provided to first user agent 202 in step 412.

Request monitor 210 queries (416) content cache 220 for any content data relating to the request data. Request monitor 210 can supply request header data to content cache 220 and the content cache 220 returns content data if the content data is still "fresh" (as defined in RFC 1945 and RFC 2616) and if there is a match between the grouping classification and the supplied request header data. For example, as stated above, a content cache has 3 groupings relating to the URL www-.somewhere.com; one corresponding to the "nokia" text-string, one corresponding to the "motorola" text-string, and one corresponding to the Internet Explorer x.x user agent provided to content cache 220 in step 422. Like before, request monitor 210 can provide additional request header data, such as user agent header data, to content cache 220. In this particular exemplary embodiment, content cache 220 examines the user agent data grouping classification of the three groupings to determine if there is a match. Based on the preconfigured groupings, content cache 220 does not find a match for a "samsung" text string provided within the user agent request header data. Thus, content cache 220 communicates to request monitor 210 that there was not a match.

In some instances, there could be a match, but the content data stored in the content cache is not fresh. In this case, the content cache 220 would communicate to request monitor that there was no match or the content cache 220 could indicate that there was a match, but it was stale content data and the request data should be transmitted to content server.

After the communication between request monitor 210 and content cache 220, request monitor forwards (418) to content server 114 the request data that originated at second user agent 204. Consequently, content server 114 provides (420) response data (e.g., HTTP response data) associated with the request data to response monitor 230 of OS 110. The response data can include, among other things, content data relating to the requested URL, a response data header, etc. The response data can include, among other things, content data relating to the requested URL, a response data header, etc. The response data header may include a "Vary" header data, defined in RFC 2616, identifying data that the content server selects to represent the content data so that this content data can be later considered for subsequent requests. In addition, the response header data can include, among other things, a content length header, a freshness expiration header, etc. Further, in this exemplary embodiment, content server 114 includes information within the response data header that indicates that the content data is cacheable.

After response monitor 230 receives the response data, response monitor 230 can transmit (422) all or portions of the response data to content cache 220 for later referencing. As described above, the response data can be organized into a grouping that has been preconfigured to or generated automatically to include this response data and subsequent response data that includes substantially similar content data. Content cache 220 can provide this response data into a new grouping that differentiates based on the classifications of URL www.somewhere.com and the "samsung" text-string. When content cache 220 receives subsequent request header data that matches these grouping classifications, content cache 220 could return this content data to the request monitor 210 so that the request monitor 210 can transmit the content data to the requesting user agent.

For this exemplary embodiment, after the content cache 220 has stored the response data, response monitor 230 can transmit (424) the response data to second user agent 202 for uploading.

Figure 5A:
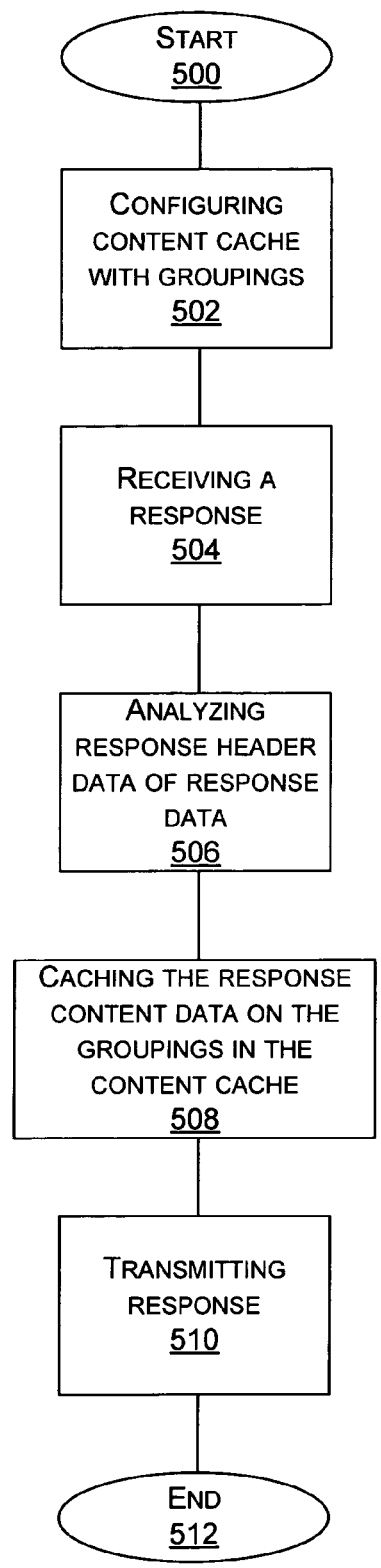
FIG. 5A is a flowchart representing an exemplary method for caching content data based on preconfigured groupings.

FIG. 5A is a flowchart representing an exemplary method for caching content data based on preconfigured groupings. Referring to FIG. 5A, it will be readily appreciated by one of ordinary skill in the art that the illustrated procedure can be altered to delete steps or further include additional steps. After initial start step 500, an administrator configures (502) a content cache with groupings. Each grouping distinguishes content data from substantially different content data. These grouping can be classified based on the content data of a request data (e.g. requested URL) and, among other things, the user agent's type, configuration, version, or features, the device requesting the request data, a particular text-string within the request header, a regular expression, more than one request header data of the response data, a combination of any of the above, or any other grouping method that can distinguish substantially different content data. For example, content data of URL www.cnn.com can be displayed differently based on whether a user is looking at the website on a Nokia™ phone or using a version of Internet Explorer. Two separate groupings could be created; one being classified based on Nokia™ phone users requesting www.cnn.com, and a second classification for users requesting content data from a version of Internet Explorer. Further, these groupings can be further classified based on substantially similar content data. For example, content data of URL www.cnn.com from Internet Explorer 5.X could be substantially similar to content data of URL www.cnn.com from Internet Explorer 6.X or be substantially similar to a particular Netscape version. Thus, a grouping classification could be created that provides a single content data entry that would be satisfied by user agents Internet Explorer 5.X, Internet Explorer 6.X, and the Netscape version version. On the other hand, for example, content data of URL www.cnn.com from Internet Explorer 3.X could be considered substantially different to the content data of Internet Explorer 5.X and Internet Explorer 6.X. Hence, this content data would not be grouped together.

After the content cache has been configured, the OS receives (504) response data from the content server. The response data can include, among other things, content data relating to the requested URL, a response data header, etc. The response data header may include a "Vary" header data, defined in RFC 2616, identifying data that the content server selects to represent the content data so that this content data can be later considered for subsequent requests. In addition, the response header data can include, among other things, a content length header, a freshness expiration header, etc. Further, in this exemplary embodiment, content server 114 includes information within the response data header that indicates that the content data is cacheable.

After the OS receives the response data, the OS can analyze (506) the response header data of the response data. For example, the response header data can include a "Vary" response header. The "Vary" response header has the ability to instruct the content cache that the content data for this response data is cacheable, but the content data may be different for request data with different request header values. For example, the following two requests can include header data:

GET/HTTP/1.1
Host: www.somewhere.com
X-MSISDN: 0124356789
User-Agent: Mozilla/4.0 (compatible; MSIE 6.0; Windows NT 5.1; QFE 123456) and
GET HTTP/1.1
Host: www.somewhere.com
X-MSISDN: 9876543210
User-Agent: Mozilla/4.0 (compatible; MSIE 6.0; Windows NT 5.1), that can have the same response header data provided below, but with different content data:

HTTP/1.1 200 OK
Vary: User-Agent, X-MSISDN
Content Length: 1000
Expires: Thu, 01 Dec. 1994 16:00:00 GMT.

The content server provides the "Vary" header to notify the content cache that content data may be substantially affected based on the user agent and the X-MSISDN. This can lead a content cache to possibly establish thousands of cached entries having substantially similar content data. The OS can further organize these thousands of cached entries into a single entry by establishing grouping classifications that identify substantially similar content data. Instead of having thousands of cached entries having substantially similar content data, the content cache may have only one entry.

Based on the configured groupings, the OS can distinguish between these two different content data having the same response data header. For example, knowing that the user agent affects the content data while the X-MSISDN data does not, the content cache was configured in step 502 to group the content data based on user agents having requests that produces different content data. The content cache ignores the X-MSISDN header data for subsequent requests because this header data does not affect the type of content data.

After analyzing the response header data, the OS can cache (508) the content data and the response header data into content cache and map this content data to the configure grouping. If content data already existed for this grouping, the received content data and response header data could update the previously stored cached data. If content data is not stored in the content cache, the content data and response header data could be saved in the content cache for future referencing.

The OS can proceed to transmitting (510) the response data to the user agent that requested the content data. The user agent can then upload the content data for viewing. After the user agent receives the transmission, the method can end (512).

Figure 5B:
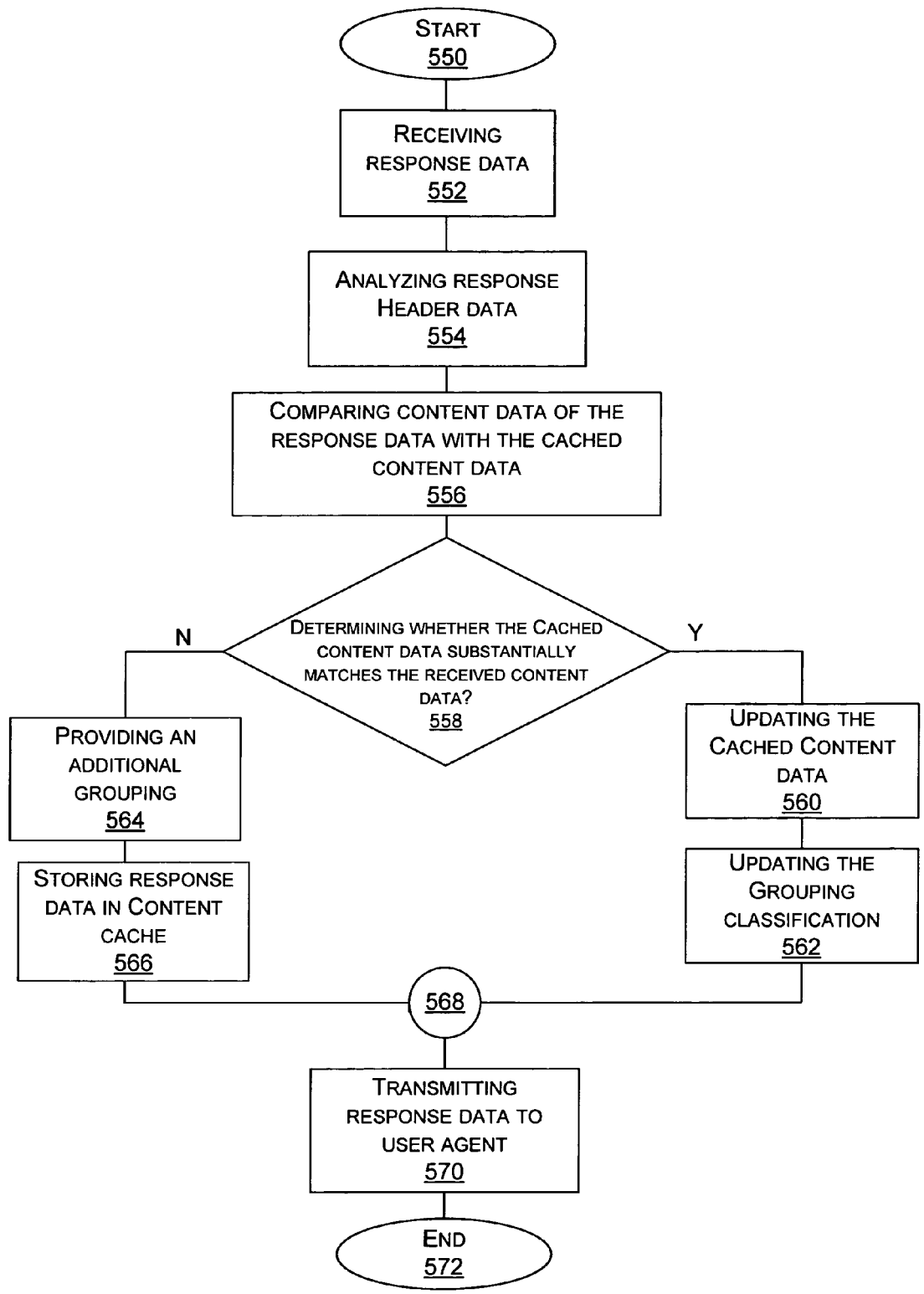
FIG. 5B is a flowchart representing an exemplary method for caching content data based on an automatically configured grouping.

FIG. 5B is a flowchart representing an exemplary method for caching content data based on automatically configured groupings. Referring to FIG. 5B, it will be readily appreciated by one of ordinary skill in the art that the illustrated procedure can be altered to delete steps or further include additional steps. After initial start step 550, the OS receives (552) response data from the content server. The response data can include, among other things, content data relating to the requested URL, a response data header, etc. The response data header may include a "Vary" header data, defined in RFC 2616, identifying data that the content server selects to represent the content data so that this content data can be later considered for subsequent requests. In addition, the response header data can include, among other things, a content length header, a freshness expiration header, etc. Further, in this exemplary embodiment, content server 114 includes information within the response data header that indicates that the content data is cacheable.

After the OS receives the response data, the OS can analyze (554) the response header data of the response data. For example, the response header data can include a "Vary" response header. The "Vary" response header has the ability to instruct the content cache that the content data for this response data is cacheable, but the content data may be different for request data with different header values. For example, the following two requests can include header data:

GET/HTTP/1.1
Host: www.somewhere.com
X-MSISDN: 0124356789
User-Agent: Mozilla/4.0 (compatible; MSIE 6.0; Windows NT 5.1; QFE 123456) and
GET/HTTP/1.1
Host: www.somewhere.com
X-MSISDN: 9876543210
User-Agent: Mozilla/4.0 (compatible; MSIE 6.0; Windows NT 5.1), that can have the same response header data, but with different content data:

HTTP/1.1 200 OK
Vary: User-Agent, X-MSISDN
Content Length: 1000
Expires: Thu, 01 Dec. 1994 16:00:00 GMT.

The content server provides the "Vary" header to notify the content cache that content data may be substantially affected based on the user agent and the X-MSISDN. This can lead a content cache to possibly establish thousands of cached entries having substantially similar content data. The OS can further organize these thousands of cached entries into a single entry by establishing grouping classifications that identify substantially similar content data. Instead of having thousands of cached entries having substantially similar content data, the content cache can have only one entry.

Based on the configured groupings, the OS can distinguish between these two different content data having the same response data header by comparing (556) the content data of the response data with the cached content data stored at a content cache. Based on the comparison, the OS determines whether the cached content data is substantially similar to the received content data. If the data is substantially similar, the OS can update (560) the cached content data with the received content data. Further, OS can update (562) the grouping classification based on the response header data to allow subsequent requests to retrieve this content data without having to transmit the request data to the content server. The method can proceed to connector 568.

On the other hand, if the received content data is substantially different from the cached content data, the OS can provide (564) an additional grouping based on the requested URL and the content data associated with the requested URL. The OS can further define the grouping by establishing grouping classifications that can assist the OS in determining whether request header data corresponds to the cached content data. The OS can then cache (566) the content data and the response header data for referencing by subsequent requests and the method can proceed to connector 568.

Then, the OS can transmit (570) the response data to the user agent that requested the content data. The user agent can then upload the content data for viewing. After the OS transmits the response data, the method can end (572).

Figure 6:
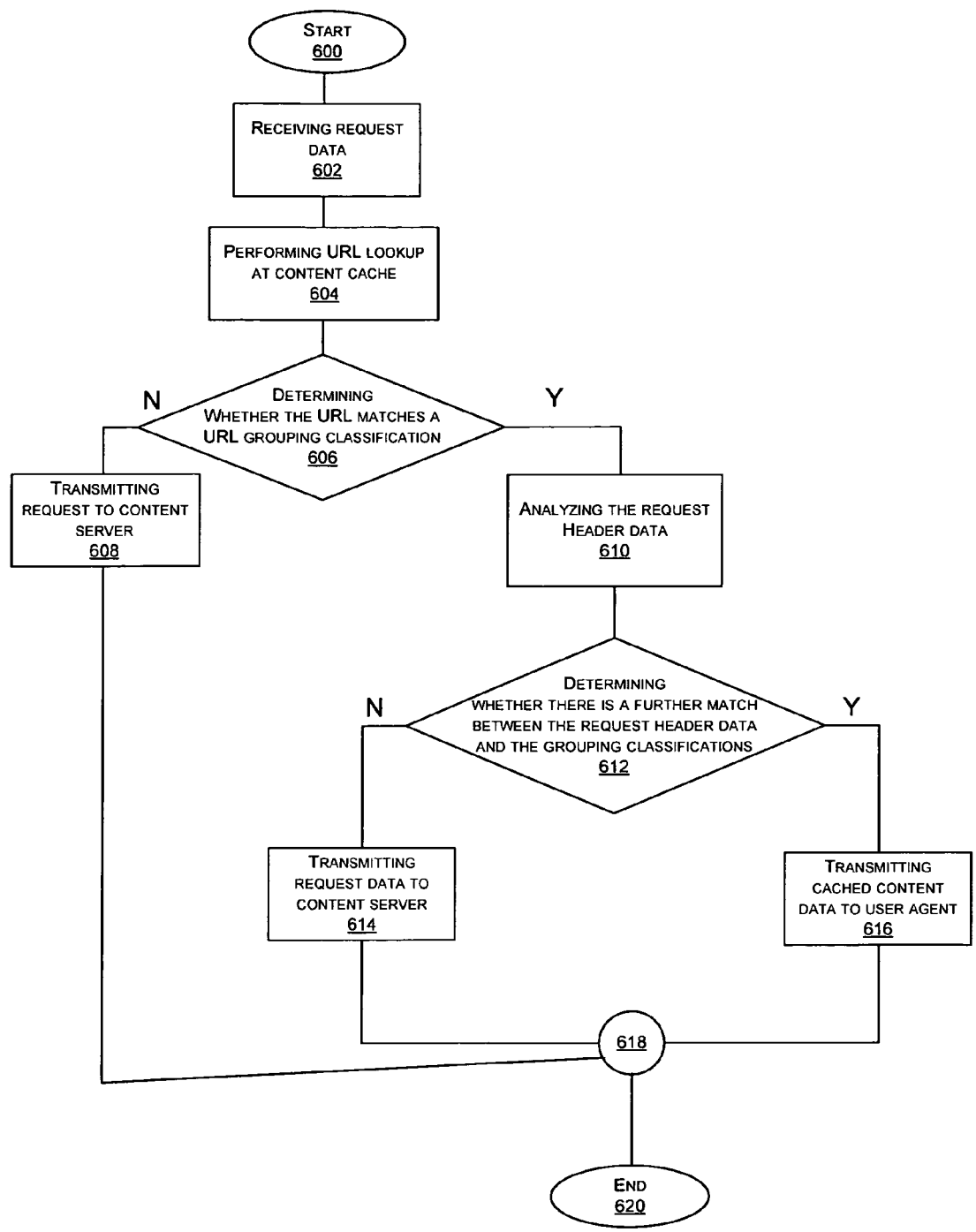
FIG. 6 is a flowchart representing an exemplary method for determining whether cached content data can be provided to the requesting user agent.

FIG. 6 is a flowchart representing an exemplary method for determining whether cached content data can be provided to the requesting user agent. Referring to FIG. 6, it will be readily appreciated by one of ordinary skill in the art that the illustrated procedure can be altered to delete steps or further include additional steps. After initial start step 600, the OS receives (602) request data from a user agent. In some embodiments, the request data may come from a client device. The request data may include a request header, such as:

GET/HTTP/1.1
Host: www.cnn.com
X-MSISDN: 0124356789
User-Agent: Mozilla/4.0 (compatible; MSIE 6.0; Windows NT 5.1; QFE 123456).

After the OS receives the request data, the OS can perform (604) a URL lookup at a content cache for any cached content data relating to the requested URL provided in one or more groupings within the content cache. Based on the cached content data, the OS can determine (606) whether the requested URL matches a URL identified in a grouping classification. In general, the grouping classification can identify the proper content data to provide to the user agent if any exists. If the requested URL does not match the URL grouping classification, content data that corresponds to the requested URL does not exist in the content cache. Further, the OS can transmit (608) the request to a content server where the content server gathers the content data relating to the request data and any additional data and transmits the response data back to the OS. After the transmission, the method can proceed to connector 618 and then end (620).

Otherwise, where the URL request data matches the URL grouping classification, the OS can further analyze (610) the request header data to further determine whether the stored content data is suitable for the requested URL. In some embodiments, the requested URL may match to grouping classifications in multiple groupings where the OS has the ability further define the match based on the request header data. The following is an exemplary request header data:

GET/HTTP/1.1
Host: www.somewhere.com
X-MSISDN: 0124356789
User-Agent: Mozilla/4.0 (compatible; MSIE 6.0; Windows NT 5.1; QFE 123456).

A grouping could be based on the URL corresponding to the received content data and other additional data. Based on the analysis, the OS can determine (612) whether there is a further match between the request header data and the grouping classification. For example, the request header could include the URL www.somewhere.com, the user agent being Internet Explorer 6.X, and the X-MSISDN being 0123456789. Further, a grouping could include grouping classifications that identify the content data. These grouping classifications can include the URL www.somewhere.com, user agents being Internet Explorer 5.X, Internet Explorer 6.X, and any varied X-MSISDN header data. In this particular instance, the content cache has grouping classification based on the data concerning the user agent because this content data has been deemed as being affected by the types of user agents and not the X-MSISDN data. If there is not a match, the OS can transmit (614) the request data to a content server where the content server transmits response data to the OS; the response data including content data corresponding to the request. After the transmission, the method can proceed to connector 618 and then end (620).

On the other hand, if the OS determines that there is a further match between the request header data and the grouping classifications, the OS can transmit (616) the stored content data to the user agent without having to transmit data to content server. After the transmission, the method can proceed to connector 618 and then end (622).

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A computer-implemented method comprising:
    receiving first request data from a first user agent, wherein the first request data corresponds to a request for web content and the first request data includes a uniform request locator (URL) and first request header data;
    determining whether the URL and the first request header data match with a URL value of a grouping and a first header data value of multiple header data values of the grouping, wherein:
    the grouping includes at least a first grouping classification and a second grouping classification, both of which correspond to a single copy of cached content data,
    the first grouping classification includes the first header data value of the multiple header data values and indicates that the single copy of cached content data is at least substantially similar to first web content that could be requested based on the URL value and the first header data value, and
    the second grouping classification includes a second header data value of the multiple header values, the second header value is different from the first header data value, the second grouping classification indicates that the single copy of cached content data is at least substantially similar to second web content that could be requested based on the URL value and the second header data value, wherein the grouping can maintain the single copy of cached content data even though the first web content is not identical to the second web content; and
    transmitting, from an optimization server, the cached content data to the first user agent based on the determination.

2. The method of claim 1, wherein the transmission of cached content data to the first user agent occurs based on the first request header data matching the information in an entry of at least one of the at least two grouping classifications.

3. The method of claim 1, further comprising determining whether additional request header data matches information associated with a grouping if the URL and the request header data match information from multiple groupings.

4. The method of claim 1, wherein the grouping can maintain the single copy of cached content data even though the requested web content and the substantially similar cached content data will not be identical.

5. The method of claim 1, wherein the first request header data of the first request includes one or more header data entries, any of which could provide the first request header data for matching with the information of the grouping.

6. The method of claim 1, further comprising:
receiving second request data from a second user agent, wherein the second request data includes the URL and second request header data that is different from the first request header data;
determining whether the URL and the second request header data match the information of the grouping; and
transmitting the cached content data to the second user agent based on the determination.

7. The computer-implemented method of claim 1, wherein determining whether the URL and the first request header data match with the URL value of the grouping and the first header data value of multiple header data values of the grouping further comprises:
determining whether the URL matches with the URL value of the grouping; if the URL matches with the URL value associated with multiple grouping classifications, comparing the first request header data with header data values associated with one or more grouping classifications of the multiple grouping classifications.

8. A server comprising:
a memory storing a set of instructions; and
a processor configured to execute the set of instructions to cause the server to:
receive first request data from a first mobile device having a first user agent, wherein the first request data corresponds to a requested web page and includes a uniform request locator (URL) and first request header data,
determine whether the URL and the first request header data match with a URL value of a grouping and a first header data value of multiple header data values of the grouping, wherein:
the grouping includes at least a first grouping classification and a second grouping classification, both of which correspond to a single copy of cached content data,
the first grouping classification includes the first header data value and indicates that the single copy of cached content data is at least substantially similar to first web content that could be requested based on the URL value and the first header data value, and
the second grouping classification includes a second header data value of the multiple header values, the second header value is different from the first header data value, the second grouping classification indicates that the single copy of cached content data is at least substantially similar to second web content that could be requested based on the URL value and the second header data value, wherein the grouping can maintain the single copy of cached content data even though the first web content is not identical to the second web content, and
transmit the cached content data to the first user agent based on the determination.

9. The server of claim 8, wherein the first request header data of the first request includes one or more header data entries, any of which could provide the first request header data for matching with the information of the grouping.

10. The server of claim 8, wherein the processor is configured to execute the set of instructions to further cause the server to transmit the cached content data to the first user agent based on the first request header data matching the information in an entry of at least one of the at least two grouping classifications.

11. The server of claim 8,
wherein the processor is configured to execute the set of instruction to further cause the server to:
receive second request data from a second agent, wherein the second request data includes the URL and second request header data that is different from the first request header data,
determine whether the URL and the second request header data match the information of the grouping, and
transmit the cached content data to the second user agent based on the determination.

12. A non-transitory computer readable medium including instructions that, when executed, causes a computer to perform a method for providing cached content data to a first user agent, the method comprising:
receiving request data from the first user agent, wherein the first request data corresponds to a request for web content and the request data includes a uniform request locator (URL) and first request header data;
determining whether the URL and the first request header data match with a URL value of a grouping and a first header data value of multiple header data values of the grouping, wherein:
the grouping includes at least a first grouping classification and a second grouping classification, both of which correspond to a single copy of cached content,
the first grouping classification includes the first header data value and indicates that the single copy of cached content data is at least substantially similar to first web content that could be requested based on the URL value and the first header data value, and
the second grouping classification includes a second header data value of the multiple header values, the second header value is different from the first header data value, the second grouping classification indicates that the single copy of cached content data is at least substantially similar to second web content that could be requested based on the URL value and the second header data value, wherein the grouping can maintain the single copy of cached content data even though the first web content is not identical to the second web content; and
transmitting the cached content data to the first user agent based on the determination.

13. The non-transitory computer readable medium of claim 12, wherein the first request header data of the first request includes one or more header data entries, any of which could provide the first request header data for matching with the information of the grouping.

14. The non-transitory computer readable medium of claim 12, wherein the transmission of cached content data to the first user agent occurs based on the first request header data matching the information in an entry of at least one of the at least two grouping classifications.

15. The non-transitory computer readable medium of claim 12, wherein the method further comprising:
receiving second request data from a second user agent, wherein the second request data includes the URL and second request header data that is different from the first request header data;

determining whether the URL and the second request header data match the information of the grouping; and transmitting the cached content data to the second user agent based on the determination.

* * * * *